May 9, 1933.     C. A. ANDERSON     1,908,297
ELECTRICAL TESTING APPARATUS
Filed May 19, 1932
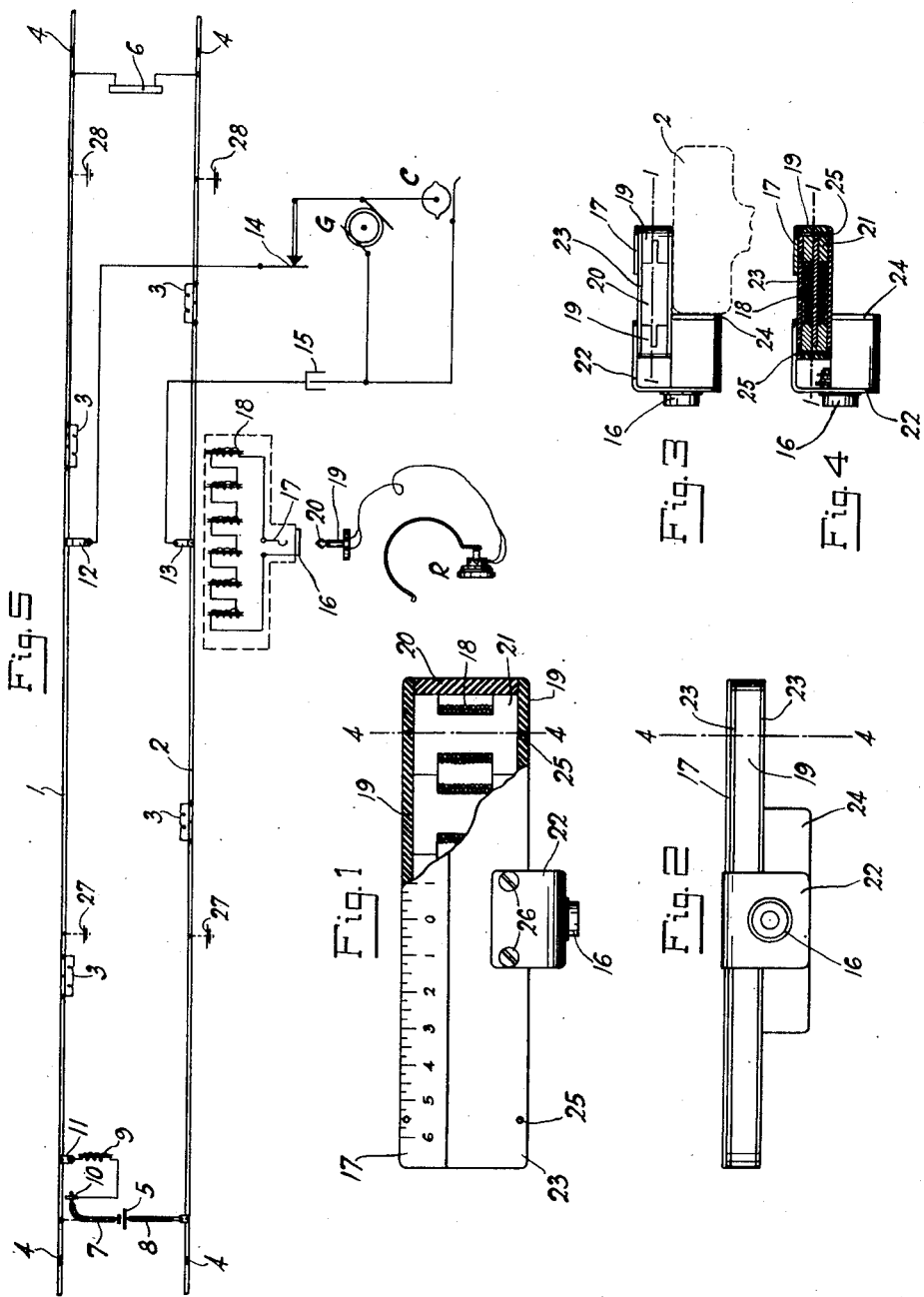
Inventor
Clarence A. Anderson
Atty.

Patented May 9, 1933

1,908,297

UNITED STATES PATENT OFFICE

CLARENCE A. ANDERSON, OF CHICAGO, ILLINOIS, ASSIGNOR TO ASSOCIATED ELECTRIC LABORATORIES, INC., OF CHICAGO, ILLINOIS, A CORPORATION OF DELAWARE

ELECTRICAL TESTING APPARATUS

Application filed May 19, 1932. Serial No. 612,254.

This invention relates to apparatus for detecting and locating faults in electrical circuits and is particularly adapted for detecting and locating ground leaks in railway track circuits.

In railway signalling systems in general use, the track rails usually comprise a part of the signal control circuits. In order that these circuits may operate efficiently and reliably, it is necessary to insulate the rails from the ground and from each other. The required insulation is provided by the ballast in which the track is laid. While the ballast ordinarily used, such as crushed stone, cinders, etc., is not a perfect insulator, it serves the purpose sufficiently well when free of excessive moisture.

Under actual operating conditions it frequently happens that the insulating properties of the ballast is lowered through the accumulation of moisture or foreign matter. This condition, unless corrected, may seriously interfere with the operation of the signal circuit and impose an unnecessarily heavy drain on the battery which supplies current to the circuit. Once the point of leakage to ground is discovered, it is easily corrected by renovating the ballast or by providing better drainage as required. The point of leakage is frequently very difficult to locate by methods heretofore in use which consist essentially of a visual inspection of the track associated with the signal circuit.

The present invention has for its object the provision of a more reliable method of locating ground leaks in railway tracks by means of simple electrical tests. An improved exploring device has been provided for facilitating the tests, and this device constitutes one of the main features of the invention.

The invention has been illustrated in the accompanying drawings comprising Figs. 1 to 5, inclusive. Figs. 1 to 4, inclusive, show the exploring device, Fig. 1 being a top view with a section cut away to show the interior construction; Fig. 2 a side view; Fig. 3 an end view; and Fig. 4 a cross-sectional view along the line 4—4. Fig. 5 shows diagrammatically a test circuit and a track circuit in the relationship required for testing.

Referring now to Fig. 1, it will be seen that the exploring device consists of a number of coils 18 whose cores 21 are laid edge to edge with their axes parallel. The number of coils provided is determined by the sensitivity required, six coils being sufficient for ordinary use. Each coil consists of a number of turns of copper wire wound on a laminated iron I shaped core. The number of turns of wire per coil may vary within wide limits and is dependent mainly on the type of receiver to be used with the device. Actual tests have shown that a device consisting of six coils of two hundred turns each of No. 34 B. & S. gauge wire will operate satisfactorily with a 60-ohm receiver, while six coils of six turns each of No. 12 B. & S. gauge wire are preferable for use with an 0.1-ohm receiver. The dimensions of the cores may also vary within wide limits, a particularly convenient and satisfactory size consisting of thirty-six laminations of No. 29 U. S. gauge silicon sheet iron with a length of 1⅝ inches and an overall width of 1¼ inches. The central portion of the core is cut back to a width of one inch to provide space for the winding.

The manner in which the coils are assembled is shown in the cut-away portion of Fig. 1 and in Fig. 4. The ends of the cores are inserted in slots in the side pieces 19. End pieces 20 are fitted into the slots at each end of the assembly as shown, and cover pieces 25 are placed over the side and end pieces. An indicating strip 17 is placed along the front edge of the top cover piece and the whole assembly is riveted together by means of rivets 25. The strip 17 is marked off in arbitrary units in both directions from a zero point in the middle. This zero point is located at the point at which the coils are electrically balanced.

A bracket 22 is centrally located along the rear edge of the coil unit and is attached to the upper cover plate by means of screws 26. The bracket, which may be formed of a single piece of metal, preferably brass, is drilled to accommodate a spring contact jack 16 and a portion 24 of the lower edge is bent up to lie parallel with the axis of the coil unit and serves as a guide member for positioning the exploring device in proper relation to a rail under test. The jack may be an ordinary two-contact jack of the general type disclosed in Carter Patent No. 1,620,755, of March 15, 1927, and accommodates the two-contact plug 19—20 shown in Fig. 5.

Referring now to Fig. 5, it will be seen that the coils of the exploring device are connected in series across the two contacts of the jack. When using the device, a receiver R will be connected in series with the coils by means of a plug whose contacts 19 and 20 engage the jack contacts 16 and 17. The exploring device is placed on or adjacent to a current carrying conductor with the axes of the coils perpendicular to the axis of the conductor. The magnetic field surrounding the conductor induces a current in the coils which, under proper conditions, is audible in the receiver R. By exposing varying lengths of the device to conductors in which the currents flow in opposite directions, a balanced condition may be attained at which point no tone will be audible in the receiver. The ratio of the coil exposure to the two conductors as indicated by the calibrated scale gives a measure of the relative amount of current flowing in each circuit.

The tone current generator shown in Fig. 5 is of the same general type as that disclosed in applicant's United States Patent No. 1,778,207, granted October 14, 1930, although any suitable tone generator may be used without departing from the spirit of the invention. As shown, the tone generator consists of a hand- or motor-driven magneto generator which is connected across a circuit under test in series with a condenser 15. The usual shaft contact 14 is provided for closing the generator circuit when the same is operated. A cam E, mounted on the generator shaft, is adjusted to short circuit the generator at the peak of each half cycle of the current wave. The condenser 15 is charged during the voltage rise and, upon the closure of the cam contacts, the condenser discharges into the circuit under test. This produces a very distinctive and penetrating tone current which has been found particularly suitable for tests of the character under consideration.

A typical track circuit is shown in Fig. 5 to illustrate the manner of locating ground leaks in such circuits. The circuit serves a single block of railway track, the rails 1 and 2 of which are insulated from the rails of adjacent blocks by insulators 4. The rails of the section are connected by the usual rail bonds 3 which provide a low resistance path around the rail joints. A battery 5 is connected across the rails at one end of the block by the heavy insulated conductors 7 and 8. A relay 6, bridged across the rails at the opposite end of the block, is normally energized when the block is unoccupied. This relay in well known manner controls the block signals which regulate the traffic.

By way of illustration, it will be assumed that, due to moisture accumulation in the ballast and ties at a point 27, the resistance between the rails and ground has decreased to an undesirably low figure. The rails, of course, are grounded at each tie along the block but, under normal conditions, the resistance of these leaks is so high that there is no interference with the operation of relay 6. The problem, therefore, is to locate the low resistance leak at 27 among the large number of high resistance leaks along the track.

The first step in applying the test is to increase the impedance of the battery bridge across the rails so that it is approximately equal to the impedance of the relay at the opposite end of the block. This is done by connecting impedance 9 in series with the battery. In order to prevent false operation of the block signals, the impedance is connected to conductor 7 and rail 1 by means of clamps 10 and 11 before the conductor is disconnected from the rail. After the connection is made, conductor 7 is disconnected from the rail, leaving the battery in series with the impedance. The impedance, incidentally, is of such value that it offers a very high resistance to the particular type of alternating current used for testing purposes, and at the same time it offers a low resistance to the direct current in the track circuit. No change is ordinarily required in the connections of the relay as the relay itself ordinarily offers a high impedance to the type of current used for the tests.

The next step in the test is the connection of the tone generator across the rails by means of clamps 12 and 13. Clamp 13, which is placed in rail 2, is provided with a mark along its center line to assist in lining up the exploring device. With the generator operating, the exploring device is then placed on the rail as shown in Fig. 3 with the center or zero point of the scale opposite the center mark of the clamp. Current flows in the rail in both directions from the clamp and returns by way of the ground leaks and rail 1 to the other side of the generator. The majority of the ground leaks have a relatively high resistance so, in the present instance, the larger part of the current will flow through the low resistance leak at 27. Equal portions of the exploring device are exposed to sections of the rail carrying currents of different values, and, consequently, the current induced in the left-hand portion will overbalance the current induced in the right-hand portion. As a result, a tone will be audible in receiver R, which indicates the unbalanced condition. The position of the exploring device is now changed until a balanced condition is attained which will be indicated by the absence of tone in the receiver. In the present instance, the device must be shifted to the right so as to expose a greater portion to the section of rail to the right of the clamp. The relation between the two positions of the device is noted on the scale and preferably recorded for future reference. Since the first reading, in this instance, gives a definite indication of the direction of the low-resistance leak, subsequent tests will be made in the direction indicated. The second test, for example, may be made at a point half-way between the first test point and the end of the block. If this test also indicates that the leak is to the left, the apparatus may be moved half the distance to the end of the block and a third test applied. When the leak is passed, the indication will be to the right, which definitely locates its position as between the last two test points. This section may then be further tested in the same manner until the exact position if the leak is determined.

In case there are several low-resistance leaks in a section of track, for example at points 27 and 28, these may be located separately by tests applied as above explained. The extent of the unbalanced condition of the exploring coil may be very small on the initial test, but gradually increases as the point of leakage is approached. When this point is passed, the change in direction will be indicated by the exploring device, and the ratio between the coil sections involved will increase suddenly. The calibrated scale is particularly helpful in detecting the small differences in current flow encountered at the intermediate points. After locating one leakage point, the apparatus may be moved toward the second point indicated until this is located in the same manner.

In the tests above described, the tone generator was connected across the rails to locate a point of leakage between them. When it is desired merely to locate a ground leak in the case of a single rail or conductor, the clamp 12 will be connected to a metal rod driven into the earth. The tests may then be applied to the conductor in the manner described above.

What is claimed is:

1. An exploring device comprising a plurality of coils disposed adjacently with axes parallel, a case enclosing said coils, and calibrations on said case perpendicular to the axes of the coils.

2. An exploring device comprising a plurality of coils, a case enclosing the coils, calibrations on the upper side of said case perpendicular to the axes of the coils, and a guide member disposed on the under side of the case parallel to said calibrations.

3. An exploring device comprising a plurality of coils, a rectangular case enclosing the coils, calibrations on the upper side of the case parallel with the axis of the case, a bracket centrally disposed on the edge of the case opposite said calibrations, and a spring contact jack mounted on said bracket.

4. An exploring device comprising a plurality of coils, a rectangular case enclosing said coils with its axis perpendicular to the axes of the coils, a bracket attached to said case and centrally located along one edge, a spring contact jack mounted on said bracket, and a guide member supported by said bracket in a position below said case and parallel to the axis of the case.

5. An exploring device comprising a plurality of coils wound on separate iron cores, slotted members engaging the ends of the cores to align the same in a single row with parallel axes, cover members connecting the first-mentioned members to form a rigid, rectangular unit, a spring contact jack mounted on the unit, and circuit connections connecting the jack contacts and coils in series.

6. The method of locating ground leaks in railway tracks which consists in setting up a flow of alternating current in opposite directions from a point on one rail, in causing the current in substantial lengths of rail on each side of said point to produce inductive effects, in changing said lengths of rail simultaneously until said inductive effects become equal, and in noting the ratio between the lengths of rail producing the equal inductive effects.

7. The method of locating ground leaks in railway track circuits which consists in setting up a flow of fluctuating current in opposite directions from a point on one rail of the track, in causing the current in adjacent sections of rail on each side of said point to influence a detecting circuit exposed thereto, in changing the exposure of said circuit to the rail sections until the combined effect of the current flow in said sections on said circuit is zero, and in noting the relative lengths of the detecting circuit exposed to the respective rail sections.

8. The method of locating ground leaks in railway track circuits which consists in setting up a flow of fluctuating current in opposite directions from a point on one rail of the track, in causing the current in substantial sections of the rail on each side of said point to induce opposing currents in an exploring device exposed thereto, in changing the position of said device to vary the exposure of the device to the respective rail sections until the currents induced therein are equal, and in noting the ratio of the portions of the device exposed to the respective rail sections.

9. The method of locating ground leaks in railway track circuits comprising a relay and a source of current bridge, respectively, across the rails at opposite ends of a section of track which consists in connecting an impedance in series with said current source, in connecting a second current source across the rails at a point substantially midway between the ends of the track section, and in exposing an exploring device to one rail adjacent to the point at which said second current source is connected thereto, and in noting the direction of greatest current flow in the rail indicated by said device.

In witness whereof, I hereunto subscribe my name this 12th day of May, 1932.

CLARENCE A. ANDERSON.